United States Patent [19]

Beaufoy

[11] Patent Number: 5,254,146
[45] Date of Patent: Oct. 19, 1993

[54] MEANS FOR EMPTYING A FILTER BOX

[75] Inventor: Jeffrey J. Beaufoy, Prior Lake, Minn.

[73] Assignee: Tennant Company, Minneapolis, Minn.

[21] Appl. No.: 997,331

[22] Filed: Dec. 28, 1992

[51] Int. Cl.$^5$ .............................................. B01D 50/00
[52] U.S. Cl. ..................................... 55/320; 15/340.3; 55/304; 55/354; 55/432
[58] Field of Search ................. 55/354, 304, 305, 432, 55/320, 321; 15/340.1, 340.3, 340.4

[56] References Cited

U.S. PATENT DOCUMENTS

| | | |
|---|---|---|
| 3,304,572 | 2/1967 | Wendel . |
| 3,780,502 | 12/1973 | Dupre et al. ............................ 55/356 |
| 4,557,739 | 12/1985 | Fortman et al. ....................... 55/320 |
| 4,708,723 | 11/1987 | Howeth .................................. 55/356 |
| 5,013,333 | 5/1991 | Beaufoy et al. ........................ 55/304 |

Primary Examiner—Charles Hart
Attorney, Agent, or Firm—Kinzer, Plyer, Dorn, McEachran & Jambor

[57] ABSTRACT

An improved means is provided for emptying dust and debris accumulated in the air filter box of a surface maintenance machine having vacuumized dust control.

12 Claims, 1 Drawing Sheet

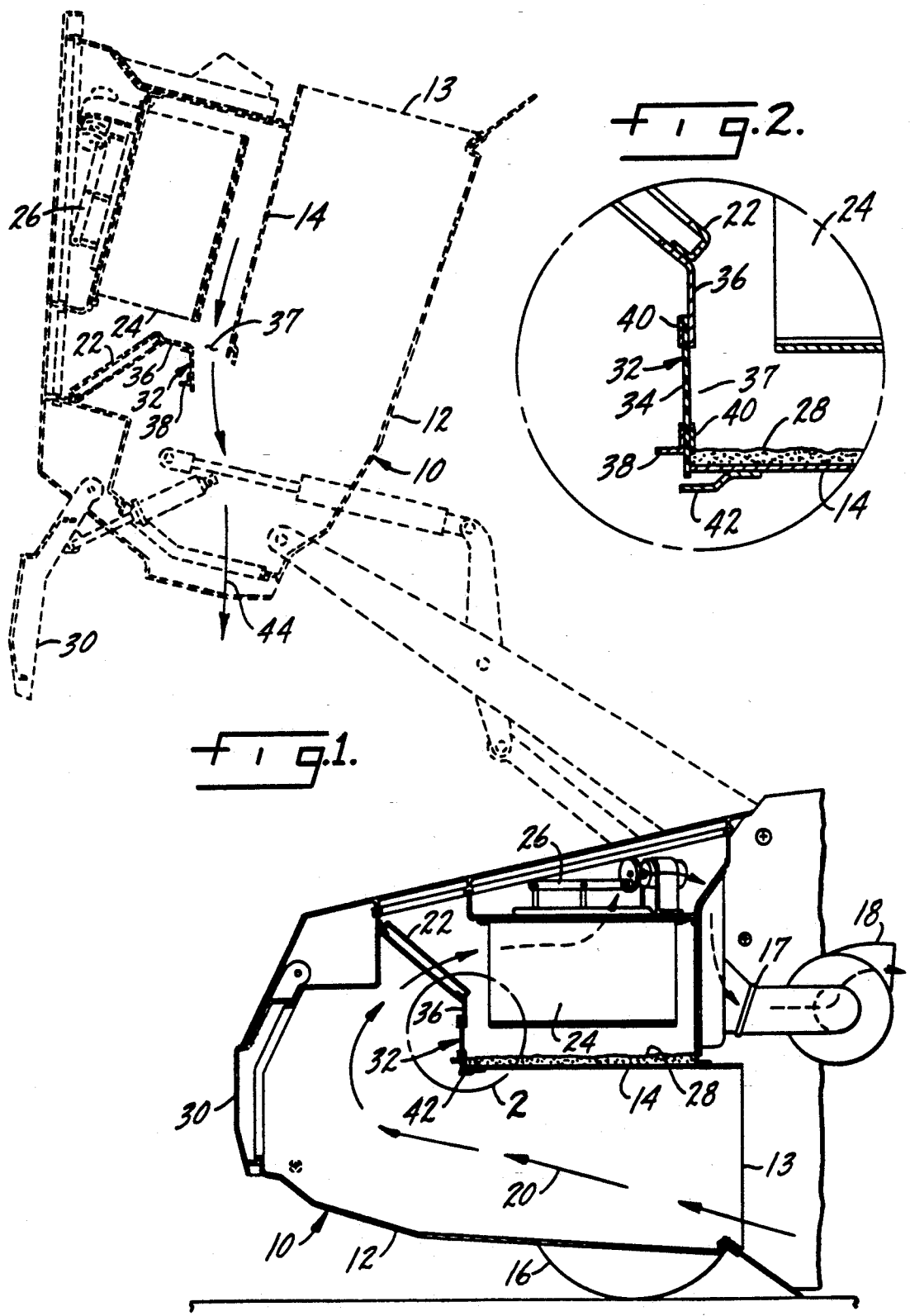

MEANS FOR EMPTYING A FILTER BOX

BACKGROUND

U.S. Pat. No. 4,557,739 to Fortman et al is assigned to the assignee of the present application, and is incorporated by reference into this specification. It describes a baffle precleaner which may be advantageously used in a sweeper having a vacuumized dust control system. This precleaner has been applied in a number of different sweeper models, where it has successfully fulfilled the objective of reducing dust load going to the related air filters. This has permitted extending the time between filter cleanings, which has reduced the wear and tear on the filters and the mechanisms for cleaning them. Thus the precleaner has proven to be a useful device, and it seems assured of a place in future generations of sweepers.

However, several years of field experience with this precleaner have revealed a problem that arises in its operation. The device is comprised of metal sheets with slotted openings in them through which the air stream passes. These slots are large enough to pass small pieces of solid debris as well as dust. For example, broken fragments of dry leaves, tiny scraps of paper, bits of thread or string and similar small items will pass through the precleaner. They lodge on the filters, and when these are cleaned such debris items fall to the bottom of the filter box and mix with the dust that is also dislodged from the filters.

This mixture of dust and debris accumulates and periodically must be emptied. The precleaner is often applied in a high dump sweeper which is dumped by tilting the hopper and filter box forward and emptying them through a dump door in the front of the hopper, as described in connection with FIG. 1 of the '739 patent. In this configuration, during the dumping operation the dust in the filter box slides forward along the bottom of the box and falls through the slots in the precleaner, after which it mixes with debris from the hopper and passes out through the dump door in the front of the hopper. Pure dust will do this without any trouble. However, when small debris items as described above are mixed with the dust, they tend to bridge across the precleaner slots and obstruct the dust from falling through the precleaner. This has made it necessary to manually clean out such debris, which is a dirty, time-consuming job. There is a need for a better way of emptying dust and debris from the filter box of such sweepers.

SUMMARY OF THE INVENTION

The present invention provides a highly reliable, completely automatic means for emptying such filter boxes that avoids the problem described above. This is done by providing the filter box with a front wall, so located in the debris hopper that there is space for the airflow to circulate in front of it. A precleaner as described in the '739 patent may be installed in the upper part of this wall, and air is drawn through it and through one or more air filters inside the filter box. However, the precleaner is high enough above the bottom of the filter box that there is room below it for a generous opening in the lower part of the front wall essentially across its full width. When the filter box is tilted forward, the dust and debris on the floor of the box slide forward and readily empty out through this opening. At least the part of the front wall containing this opening is essentially vertical. The opening is covered by a simple door which operates by gravity alone to swing open when the hopper and filter box are tilted forward and to swing closed when the hopper and filter box are tilted back to their normal operating positions. No auxiliary operating devices or latches are needed or used. Gravity alone also holds the door shut in its closed position. Then the airflow can only enter the filter box and filters through the precleaner, which of course is the intended condition during normal sweeping operation.

The effect of the invention, then, is to provide a simple, highly reliable and fully automatic gravity operated device for emptying a filter box such as described when it and a related debris hopper are tilted for dumping, and for also closing any air inlet to the filter box during normal sweeping operation except through a related desired inlet.

BRIEF DESCRIPTION OF THE DRAWINGS

FIG. 1 is a schematic longitudinal section through the forward part of a typical direct forward throw sweeper, showing its debris hopper and filter box in normal sweeping position and also in high dump position.

FIG. 2 is an enlarged view of the circled area 2 of FIG. 1, showing in detail the construction of the filter box dump door.

DETAILED DESCRIPTION OF THE INVENTION

In FIG. 1 is shown the forward portion of a direct forward throw sweeper. In principle and general construction it is similar to sweepers shown in FIGS. 2 and 5 of previously mentioned U.S. Pat. No. 4,557,739. However, there are significant differences between this design and the '739 patent, as will be seen by the following description of the present invention.

In FIG. 1 the hopper assembly of a direct forward throw sweeper is shown at 10. The term "hopper assembly" is generally taken to comprise the debris hopper 12, the filter box 14, the filter or filters 24 and other mechanism contained therein, such as, for example, a filter shaker 26 and other related parts which together comprise the unit that is tipped for dumping, as shown in dashed lines in FIG. 1. The hopper assembly is supported by the sweeper's two front wheels 16 (only one shown) and one or more rear wheels (not shown). Dirt and debris are thrown into hopper 12 by a sweeping brush (not shown) through opening 13 in the rear of the hopper, or at its right hand end as shown in the solid line portion of FIG. 1.

A sweeper stirs up dust when it is working, and it is objectionable for this to spread to the surroundings. To control it a suction blower 18 is installed. It pulls dusty air as indicated by the arrows 20 from the vicinity of the sweeping brush through the hopper 12 and through a baffle precleaner 22 which is described in the '739 patent, and which removes a portion of the dust from the airstream. Next the air passes through one or more filters 24. These are shown in FIG. 1 to be as described in U.S. Pat. No. 5,013,333 to Beaufoy et al, which is also assigned to the assignee of the present invention. However, the design of the filters is not part of the present invention, and any suitable filter design may be used. Practically all of the remaining dust and debris entrained in the airstream lodge on the filters, so that essentially clean air passes out of the filters and through duct work to the suction blower 18, where it is exhausted to atmosphere.

As dust and debris accumulate on filter 24 it gradually becomes obstructed and offers increasing resistance to the passage of air. This progressively reduces the airflow until it becomes inadequate for effective dust control. The filter is then cleaned by a shaker mechanism indicated generally at 26, which may be as described in U.S. Pat. No. 5,013,333, or may be some other cleaning system. Wide variations are possible in the design of filters and filter cleaners for use with this invention. But in any case the filter will be periodically cleaned to re-establish its porosity and restore the airflow through it, and the dust and debris dislodged from it will fall to the floor of filter box 14 and accumulate there as indicated at 28. It is necessary to periodically empty the accumulated dust and debris from the filter box, and the apparatus for doing this is the subject of this invention.

During normal sweeping the debris hopper 12 becomes filled with the debris swept up from the surface being swept, and must be periodically emptied or dumped. This is done by raising the hopper assembly 10 to a desired height, tipping it forward, and opening a hopper dump door 30. Of course, this action also tips filter box 14 forward, and in addition, as the hopper assembly 10 moves up, the air duct to suction blower 18 will be separated at doughnut seal 17. All of this is shown by dashed outline in FIG. 1. The details of this action will be omitted, as this method of dumping a sweeper hopper is entirely conventional and is well known.

In the lower part of the front wall 36 of filter box 14 there is an opening 37 provided for emptying dust and debris out of the filter box. This opening preferably extends across the width of the filter box, which is essentially the transverse width of the sweeper, but may be less wide than that. It commences at or near the floor of the filter box and extends up far enough to provide an adequate opening for emptying the dust and debris accumulated in the filter box. For example, it may be on the order of four inches high. Opening 37 is fitted with a filter box door assembly 32, best seen in FIG. 2. This door assembly is comprised of a flexible flap 34, which may be made, for example, of one-eighth inch thick fabric reinforced neoprene sheet material. A steel angle 38 or other structural shape extends essentially across the width of the flap 34, and is attached to it near its lower edge as seen in FIG. 2, typically with conventional fasteners and a backing strip 40. The upper edge of flap 34 as seen in FIG. 2 is attached to the filter box front wall 36 with conventional fasteners and another backing strip 40.

Steel angle 38 serves several purposes. For one thing it keeps the lower part of flap 34 straight so it seals properly against the edge of the filter box floor. Also, it provides a weight which has its center of gravity offset somewhat from the center of gravity of flap 34. It will be realized that this offset weight tends to swing the lower edge of flap 34 to the right as seen in FIG. 2, so the weight of the angle 38 serves to hold flap 34 in contact with the edge of the floor of filter box 14. This closes the opening 37 in the front wall of filter box 14 during normal sweeping operation so that the only inlet for air into the filter box is through the baffle precleaner 22, which is the desired condition. A third purpose of angle 38 is realized when the hopper 12 and filter box 14 are tipped forward for dumping. Then the weight of angle 38 helps pull flap 34 away from the filter box, thus assuring a wide open exit from the filter box for dust and debris to flow through. This may be seen in the dashed line portion of FIG. 1, where a series of arrows 44 indicate the path of dust and debris falling out of the filter box 14 and the hopper 12 during a dump operation. The purpose of the invention is thus fulfilled, i.e. the dust and debris 28 in the bottom of filter box 14 are automatically emptied through opening 37 without passing through precleaner 22 during a dump operation, and when hopper 12 and filter box 14 are returned to normal sweeping position the opening 37 is automatically closed and held closed by door assembly 32.

A deflector strip 42 extends essentially across the transverse width of the filter box 14, and is attached to the under side of the filter box floor by welding or other means as best shown in FIG. 2. It serves to stiffen the filter box floor so it presents a true edge to flap 34. It also serves to deflect debris that the main sweeping brush might throw in this area and which otherwise might strike the lower edge of flap 34 and swing it open, or lodge between the flap and the edge of the filter box floor.

ALTERNATIVE EMBODIMENTS

The foregoing discussion describes a sweeper having a single filter box with one or more filters in it. U.S. Pat. No. 5,013,333, which was previously mentioned, describes a sweeper having two side by side filter boxes, each with a filter in it. Such a configuration can be accommodated by the present invention by giving both filter boxes a common vertical forward wall with an opening as at 37 extending across the transverse width of both boxes. Then a door assembly as at 32 can close both filter boxes except when they are being dumped, as described above for the present invention. Or if preferred, two openings and two doors could be used, an opening and a door for each filter box.

The normal operating air inlet opening to the filter box has been described as occupied by precleaner 22. It should be realized that some other structure, or no structure at all, could occupy the air inlet opening and the operation of the dump door assembly 32 would not be affected.

Some direct forward throw sweepers are dumped by tipping their hoppers backward and emptying debris out of the hopper entrance opening, rather than by tipping forward as described above. A person familiar with sweepers will realize that in such a case the present invention can be used by providing an opening equivalent to 37 in the rear wall of the filter box, with some space beyond the wall opening into the debris hopper. Such an opening could be covered by a door assembly as at 32 in the present invention and would provide the previously described advantages of the invention in a sweeper with a rear dump hopper.

I claim:

1. In a surface maintenance machine having a vacuumized dust control system, an air filter in a filter box, means for moving said filter box between an operating position wherein dust and debris accumulate in the bottom of the box and a tilted position wherein accumulated dust and debris are emptied out of the box, said filter box being provided with an opening in one of its walls through which dust and debris may be emptied when the box is moved to said tilted position, characterized by a gravity operated closure which covers said opening when the filter box is in its operating position and uncovers said opening when said filter box is in its tilted position, said gravity operated closure having a weight attached thereto and positioned offset from the center of gravity of the closure.

2. The surface maintenance machine of claim 1 further characterized in that said gravity operated closure includes a weight generally adjacent one end thereof.

3. The surface maintenance machine of claim 1 further characterized in that said closure is a flexible flap.

4. A surface maintenance machine having a vacuumized dust control system which includes a filter box having an air filter therein, a dust collecting area in said filter box beneath said air filter, means for moving said filter box between a normal dust collecting position and a discharge position, an opening in said filter box for discharging dust from said dust collecting area, and a door for said opening, said door having a weight attached thereto and offset from the center of gravity of said door for maintaining said door in a closed position when said filter box is in a normal dust collecting position and for assisting said door in opening when said filter box moves to a discharge position.

5. The surface maintenance machine of claim 4 further characterized in that said weight is positioned adjacent the bottom of said door.

6. The surface maintenance machine of claim 5 further characterized in that said door is a flexible flap.

7. The surface maintenance machine of claim 4 further characterized in that said vacuumized dust control system includes a precleaner positioned in said dust control system upstream of said filter.

8. The surface maintenance machine of claim 7 further characterized in that said door is adjacent and beneath said precleaner.

9. The surface maintenance machine of claim 8 further characterized in that said door is generally vertical when said filter box is in a dust collecting position.

10. The surface maintenance machine of claim 9 further characterized in that said dust collecting area is the bottom of said filter box.

11. The surface maintenance machine of claim 4 further characterized by and including a deflector extending along a lower surface of said filter box directly adjacent said door to deflect airborne debris to prevent accidental opening of said door and thereby unwanted discharge of dust from said dust collecting area.

12. A surface maintenance machine having a vacuumized dust control system which includes a filter box having an air filter therein, a dust collecting area in said filter box beneath said air filter, a precleaner positioned in said dust control system upstream of said filter, means for moving said filter box between a normal dust collecting position and a discharge position, an opening in said filter box for discharging dust from said dust collecting area, a door for said opening adjacent and beneath said precleaner, said door being generally vertical when said filter box is in a dust collecting position, said door being provided with means for maintaining said door in a closed position when said filter box is in the normal dust collecting position and for assisting said door in opening when said filter box moves to the discharge position.

* * * * *